United States Patent
McKenna et al.

(10) Patent No.: US 7,140,728 B2
(45) Date of Patent: *Nov. 28, 2006

(54) METHOD OF FORMING MAGNETIC EYEGLASS APPLIANCE

(75) Inventors: James Archie McKenna, Spokane, WA (US); Greg S. Smith, Carrollton, TX (US)

(73) Assignee: Ultimate Clip, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/862,934

(22) Filed: Jun. 7, 2004

(65) Prior Publication Data

US 2004/0218138 A1    Nov. 4, 2004

Related U.S. Application Data

(63) Continuation of application No. 10/167,808, filed on Jun. 10, 2002, now abandoned, which is a continuation of application No. 09/663,346, filed on Sep. 15, 2000, now Pat. No. 6,412,942.

(51) Int. Cl.
*G02C 9/00* (2006.01)

(52) U.S. Cl. .............................. 351/41; 351/47; 351/57

(58) Field of Classification Search ................... 351/41, 351/47, 57, 178, 48, 58; 148/100, 121, 122
See application file for complete search history.

(56) References Cited

U.S. PATENT DOCUMENTS

| | | | |
|---|---|---|---|
| 2,737,847 A | 3/1956 | Tesauro | 351/41 |
| 2,770,168 A | 11/1956 | Tesauro | 351/41 |
| 3,498,701 A | 3/1970 | Miller | 351/57 |
| 3,531,188 A | 9/1970 | LeBlanc et al. | 351/48 |
| 3,536,385 A | 10/1970 | Johnston | 351/47 |
| 3,565,517 A | 2/1971 | Gitlin et al. | 351/106 |
| 3,582,192 A | 6/1971 | Gitlin | 351/52 |
| 3,806,336 A | 4/1974 | Kaneko et al. | 75/122 |
| 3,838,914 A | 10/1974 | Fernandez | 351/106 |
| 3,954,519 A | 5/1976 | Inoue | 148/31.57 |
| 3,982,972 A | 9/1976 | Iwata et al. | 148/31.55 |
| 4,070,103 A | 1/1978 | Meeker | 351/52 |
| 4,093,477 A | 6/1978 | Iwata et al. | 148/108 |
| 4,120,704 A | 10/1978 | Anderson | 148/103 |
| 4,196,981 A | 4/1980 | Waldrop | 351/59 |
| 4,217,037 A | 8/1980 | Lemelson | 351/44 |
| 4,236,919 A | 12/1980 | Kamino | 75/126 H |
| 4,251,293 A | 2/1981 | Jin | 148/101 |
| 4,253,883 A | 3/1981 | Jin | 148/103 |
| 4,311,537 A | 1/1982 | Chin et al. | 148/108 |
| 4,324,597 A | 4/1982 | Kamino et al. | 148/103 |

(Continued)

FOREIGN PATENT DOCUMENTS

CA    2286765    10/1998

(Continued)

OTHER PUBLICATIONS

"Strip & Foil Products", Group Arnold, 2 pages, http://www.grouparnold.com/products/rolled/index.html, printed Jul. 6, 2000.

(Continued)

*Primary Examiner*—Huy Mai
(74) *Attorney, Agent, or Firm*—Wells St. John P.S.

(57) ABSTRACT

An eyeglass accessory frame includes an auxiliary frame. The auxiliary frame includes a heat-treated magnetic alloy. The heat-treated magnetic alloy of the auxiliary frame is configured to magnetically couple the auxiliary frame to a primary frame having magnetizable material. A method is also provided.

20 Claims, 14 Drawing Sheets

U.S. PATENT DOCUMENTS

| | | | | |
|---|---|---|---|---|
| 4,366,007 | A | 12/1982 | Inoue | 148/102 |
| 4,406,712 | A | 9/1983 | Louzon | 148/11.5 |
| 4,525,325 | A | 6/1985 | Livak | 420/473 |
| 4,547,909 | A | 10/1985 | Bell | 2/431 |
| 4,601,876 | A | 7/1986 | Yamashita et al. | 419/23 |
| 4,604,147 | A | 8/1986 | Brandis et al. | 148/102 |
| 4,732,625 | A | 3/1988 | Livak | 148/433 |
| 4,967,185 | A | 10/1990 | Montean | 340/572 |
| 4,988,181 | A | 1/1991 | Riach, Jr. | 351/52 |
| 5,080,475 | A | 1/1992 | Ferron | 351/57 |
| 5,181,051 | A | 1/1993 | Townsend et al. | 351/52 |
| 5,243,366 | A | 9/1993 | Blevins | 351/57 |
| 5,321,442 | A | 6/1994 | Albanese | 351/44 |
| 5,351,033 | A | 9/1994 | Lin et al. | 340/572 |
| 5,389,981 | A | 2/1995 | Riach, Jr. | 351/158 |
| 5,410,763 | A | 5/1995 | Bollé | 2/436 |
| 5,416,537 | A | 5/1995 | Sadler | 351/57 |
| 5,432,499 | A | 7/1995 | Montean | 340/572 |
| 5,477,219 | A | 12/1995 | Zarembo et al. | 340/572 |
| 5,568,207 | A | 10/1996 | Chao | 351/57 |
| 5,583,588 | A | 12/1996 | Chao | 351/153 |
| 5,592,243 | A | 1/1997 | Chao | 351/153 |
| 5,627,608 | A | 5/1997 | Chao | 351/113 |
| 5,631,719 | A | 5/1997 | Chao | 351/153 |
| 5,642,177 | A | 6/1997 | Nishioka | 351/47 |
| 5,682,222 | A | 10/1997 | Chao | 351/111 |
| 5,696,571 | A | 12/1997 | Spencer et al. | 351/47 |
| 5,737,054 | A | 4/1998 | Chao | 351/47 |
| 5,786,880 | A | 7/1998 | Chao | 351/41 |
| 5,805,259 | A | 9/1998 | Chao | 351/110 |
| 5,815,899 | A | 10/1998 | Chao | 29/20 |
| 5,877,838 | A | 3/1999 | Chao | 351/47 |
| 5,882,101 | A | 3/1999 | Chao | 351/47 |
| 5,883,688 | A | 3/1999 | Chao | 351/47 |
| 5,883,689 | A | 3/1999 | Chao | 351/47 |
| 5,929,964 | A | 7/1999 | Chao | 351/47 |
| 6,012,811 | A | 1/2000 | Chao et al. | 351/47 |
| 6,092,896 | A | 7/2000 | Chao et al. | 351/47 |
| 6,109,747 | A | 8/2000 | Chao | 351/47 |
| 6,170,948 | B1 | 1/2001 | Chao | 351/47 |
| 6,231,179 | B1 | 5/2001 | Lee | 351/47 |
| RE37,545 | E | 2/2002 | Chao | 351/57 |
| 6,375,321 | B1* | 4/2002 | Lee et al. | 351/47 |
| 6,412,942 | B1 | 7/2002 | McKenna et al. | 351/47 |
| 6,783,238 | B1* | 8/2004 | Stepper | 351/178 |
| 2002/0149737 | A1 | 10/2002 | McKenna et al. | 351/47 |

FOREIGN PATENT DOCUMENTS

| | | | |
|---|---|---|---|
| CA | 2223295 | 7/1999 | |
| CA | 2274221 | 12/1999 | |
| CA | 2258142 | 3/2001 | |
| CA | 2269373 | 10/2001 | |
| CA | 2216280 | 8/2002 | |
| CN | 107096 | 9/1987 | |
| DE | 7816 | 5/1988 | |
| DE | G 88 06 898.6 | 10/1988 | |
| DE | 39 05 041 A1 | 8/1990 | |
| DE | 39 20 879 A1 | 1/1991 | |
| DE | 39 33 310 A1 | 1/1991 | |
| DE | 43 16 698 A1 | 11/1994 | |
| DK | 1 797 366 | 9/1968 | |
| EP | 0 469 699 A1 | 5/1992 | |
| EP | 0 743 545 A1 | 11/1996 | |
| EP | 1 099 975 A2 | 5/2001 | |
| FR | 1.037.755 | 9/1953 | |
| GB | 846425 | 8/1960 | |
| GB | 855268 | 11/1960 | |
| JP | 44-15392 | 7/1969 | |
| JP | 61-117401 | 6/1986 | 148/121 |
| JP | 274588 | 4/1995 | |
| JP | 7 128620 | 5/1995 | |
| JP | 3011174 | 5/1995 | |
| JP | 30 31881 | 12/1996 | |
| SU | 220885 | 6/1968 | |
| WO | WO 90/09611 | 8/1990 | |
| WO | WO 97/16761 | 5/1997 | |

OTHER PUBLICATIONS

"Greetings from Group Arnold", Group Arnold, 2 pages, http:/www.grouparnold.com/corp/index.html, printed Jul. 6, 2000.

"Contact Group Arnold", Group Arnold, 2 pages, http:/www.grouparnold.com/corp/contact.html; printed Jul. 6, 2000.

"Rolled Products Plant", Group Arnold, 2 pages, http:/www.grouparnold.com/plants/rolled/rolled_service.html; printed Jul. 6, 2000.

"Symposium H: Advanced Hard Magnet-Principles, Materials, and Processing", Apr. 5-8, 1999; Tutorial, 16 pages plus title page; http:/www.mrs.org/meetings/spring99/abstractbook/AbstractBookH.html; printed Jul. 6, 2000.

* cited by examiner

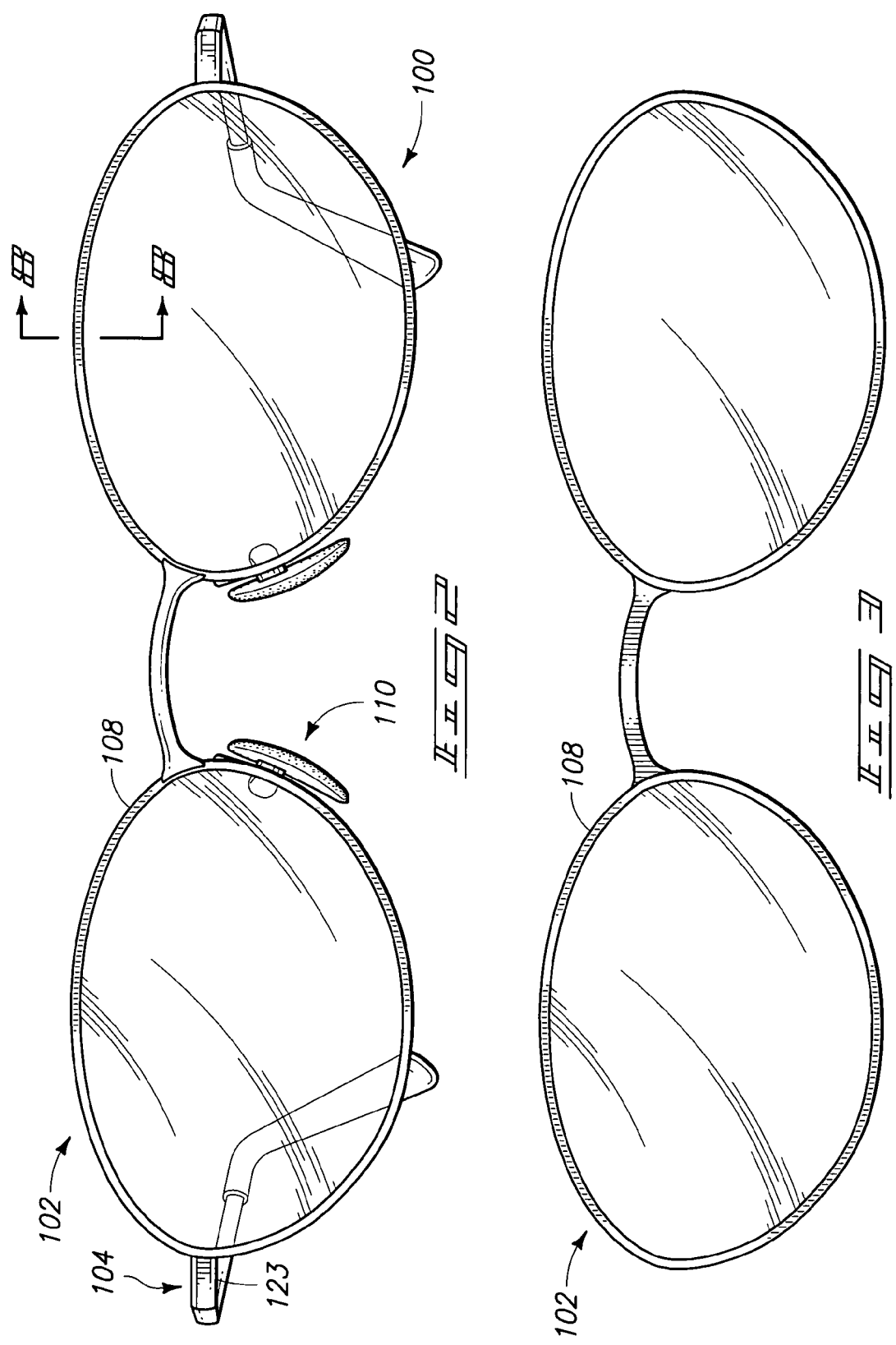

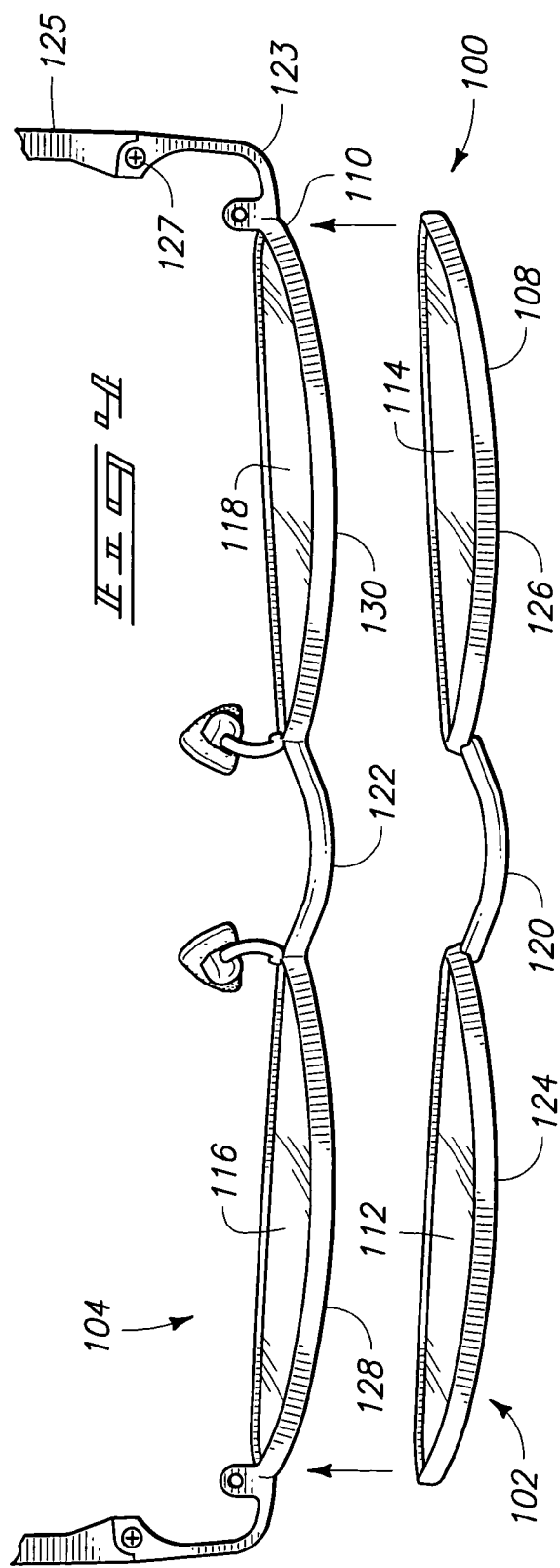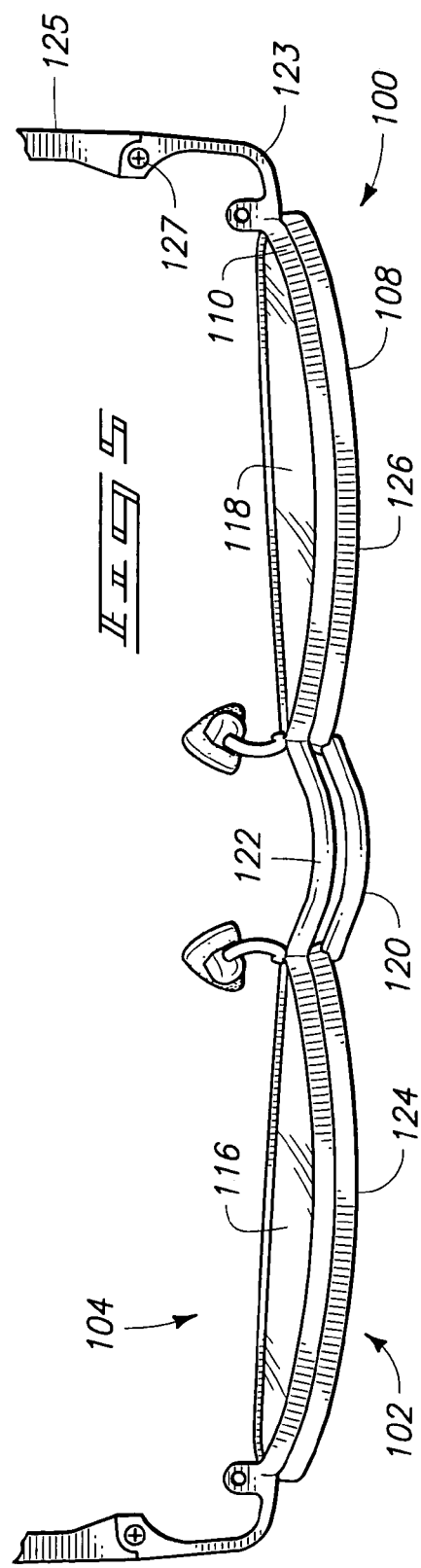

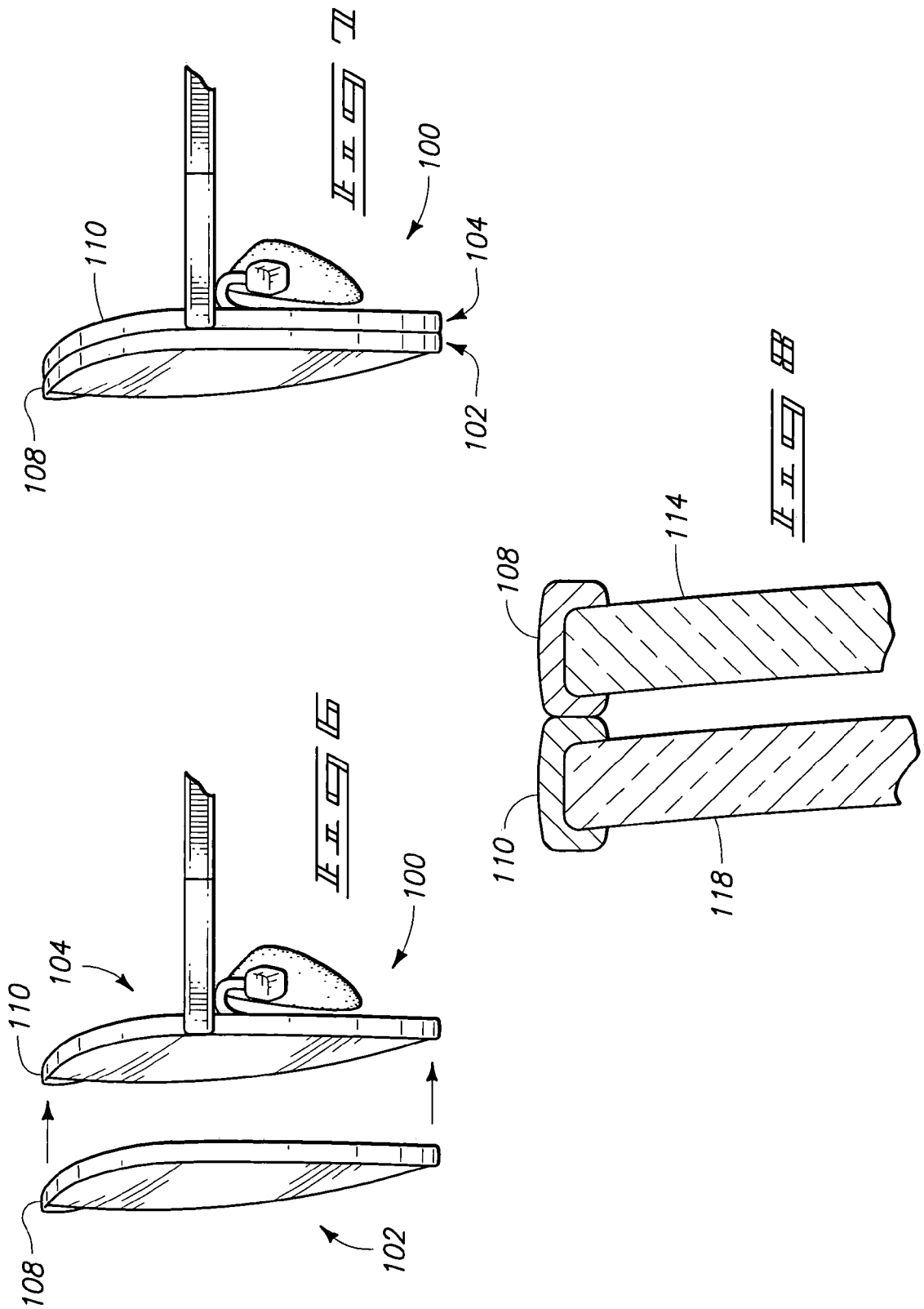

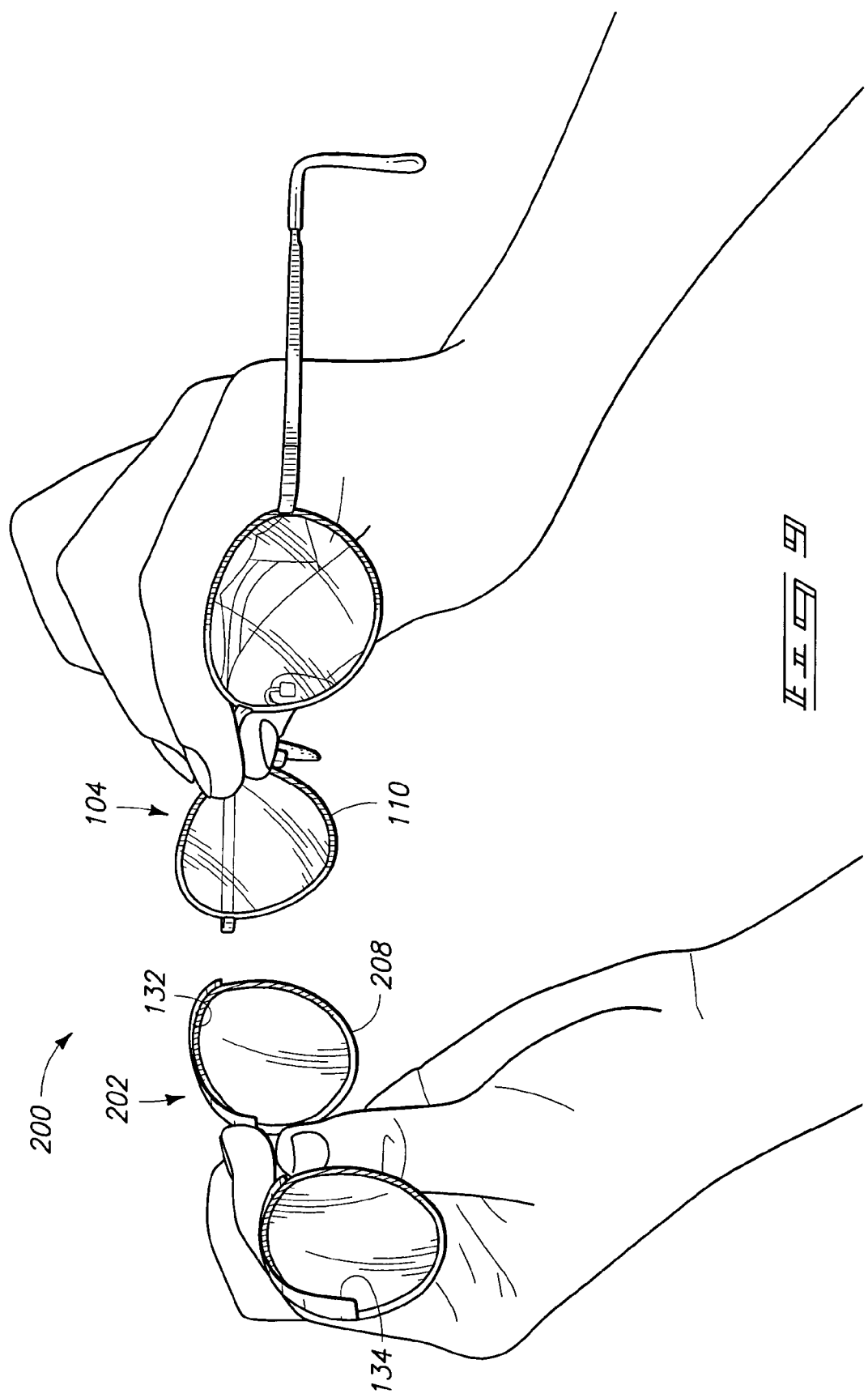

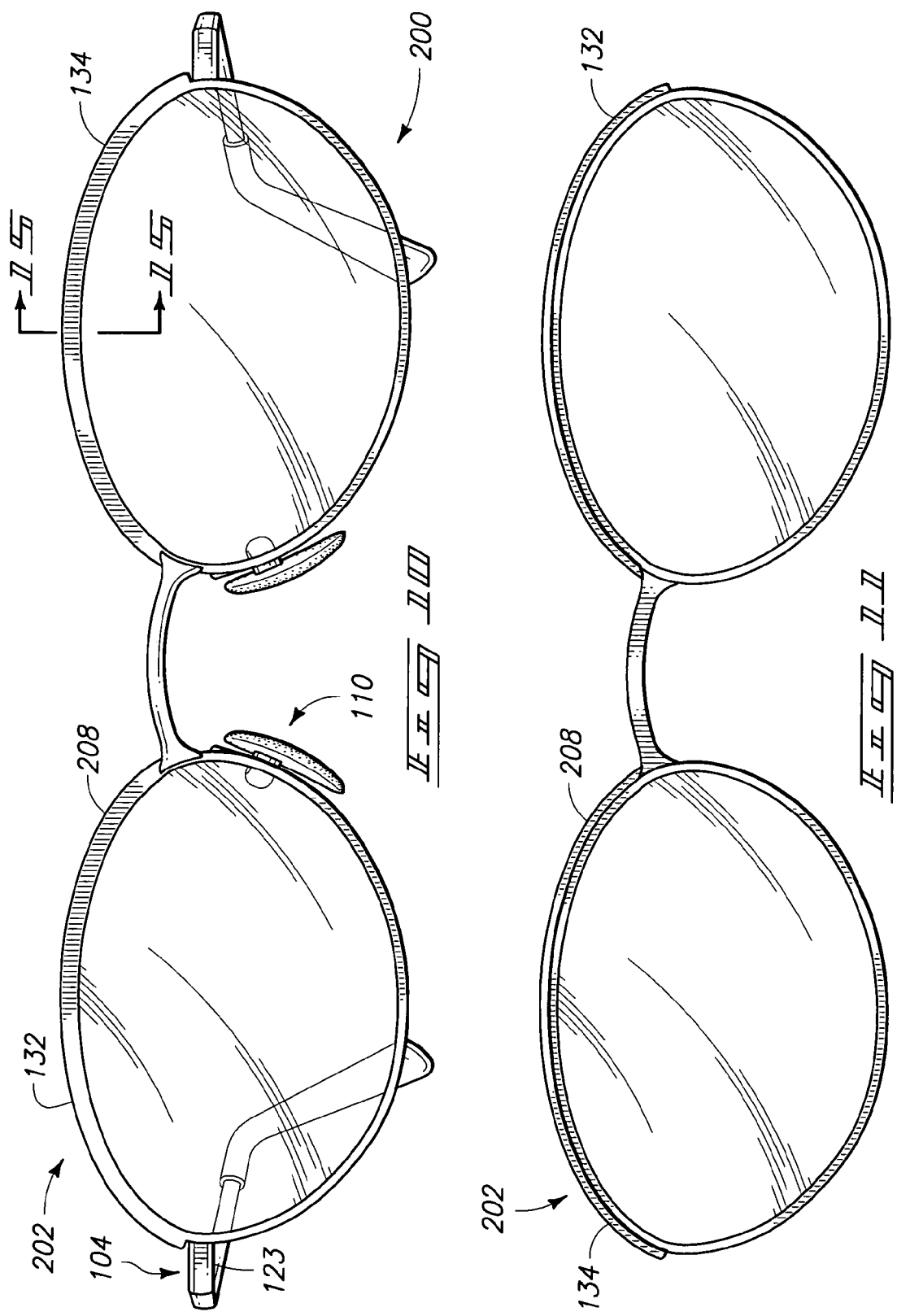

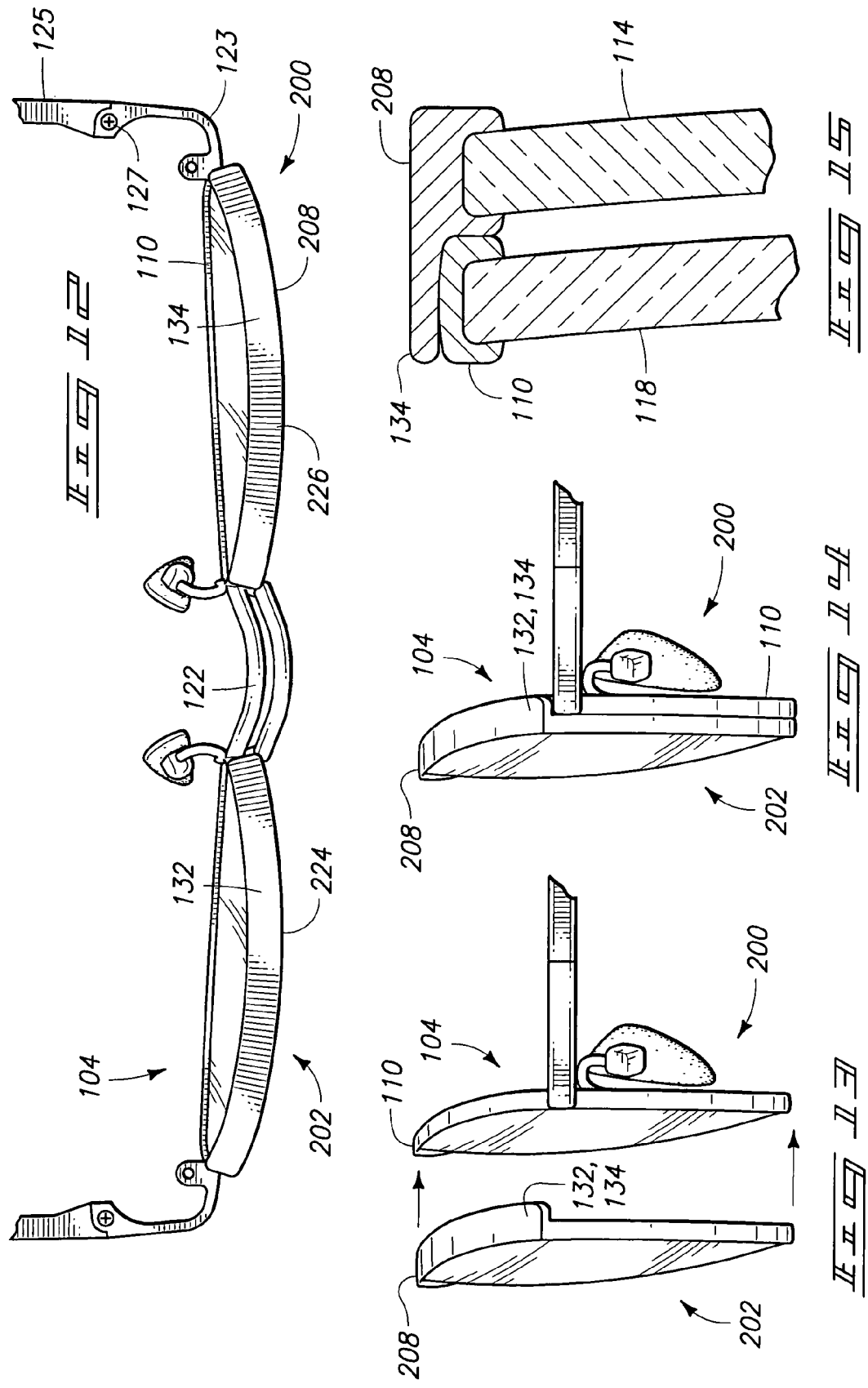

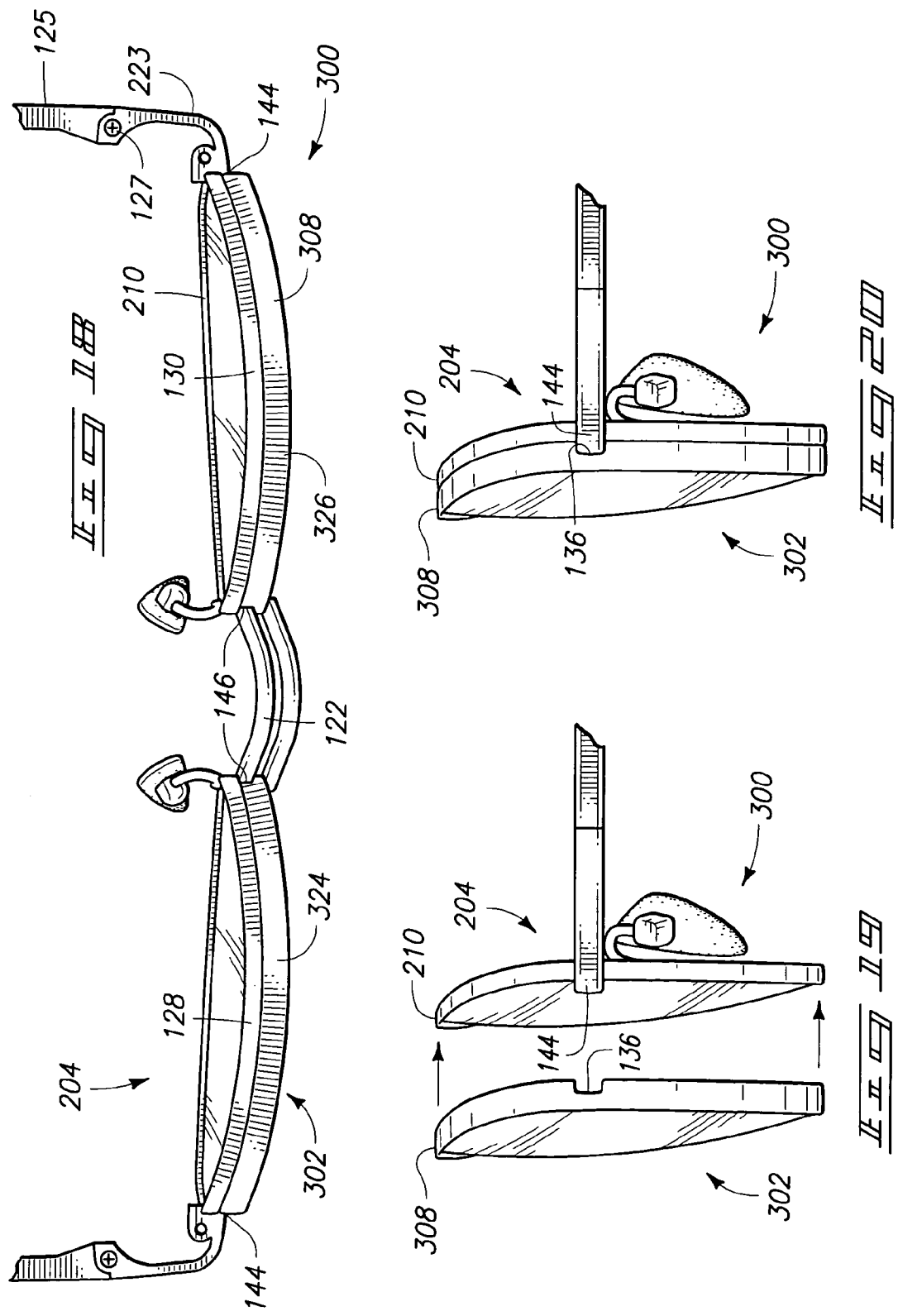

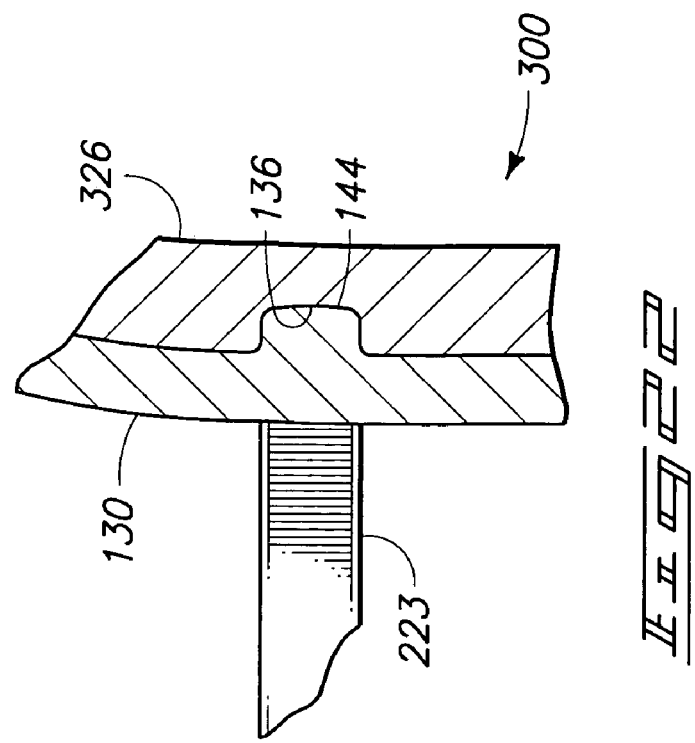
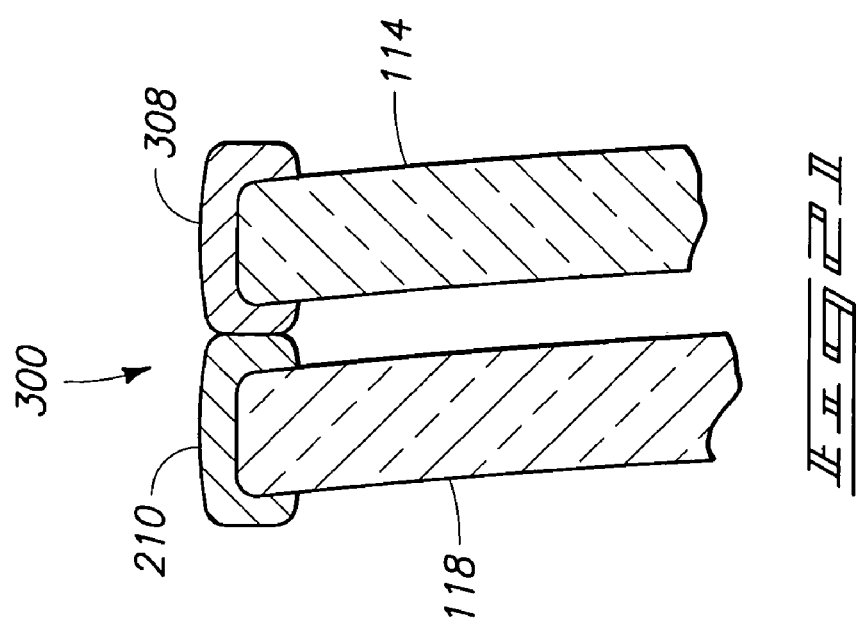

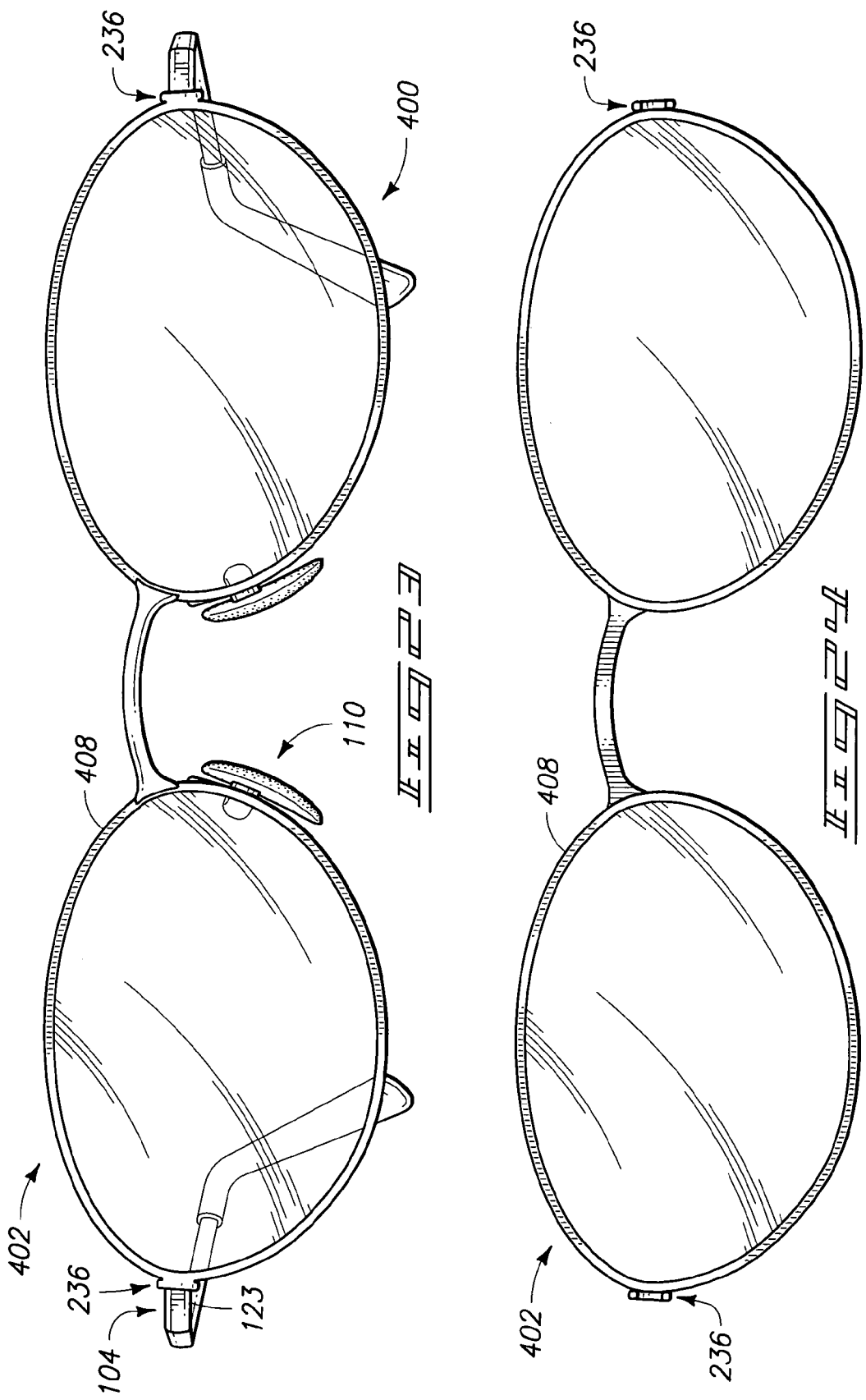

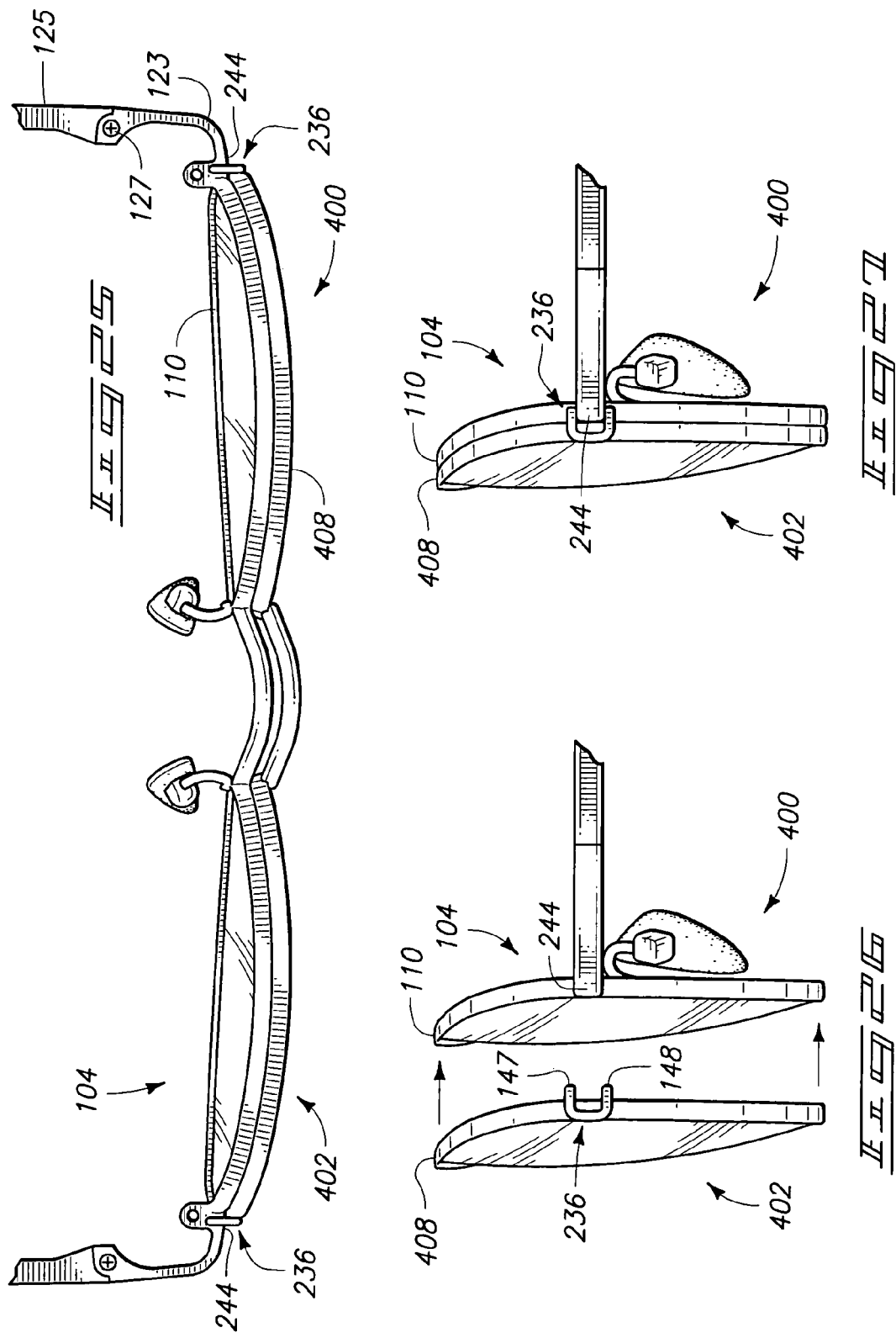

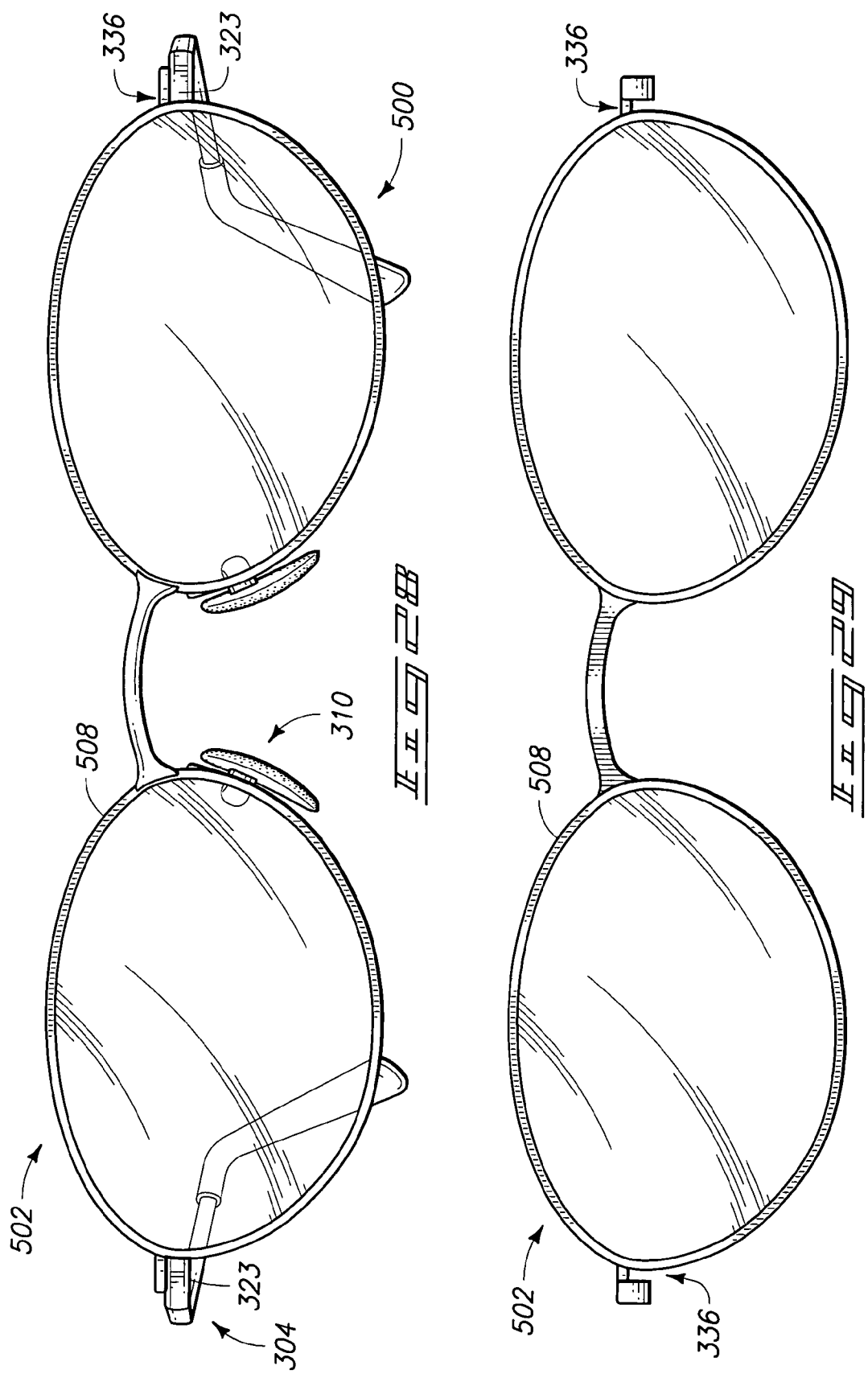

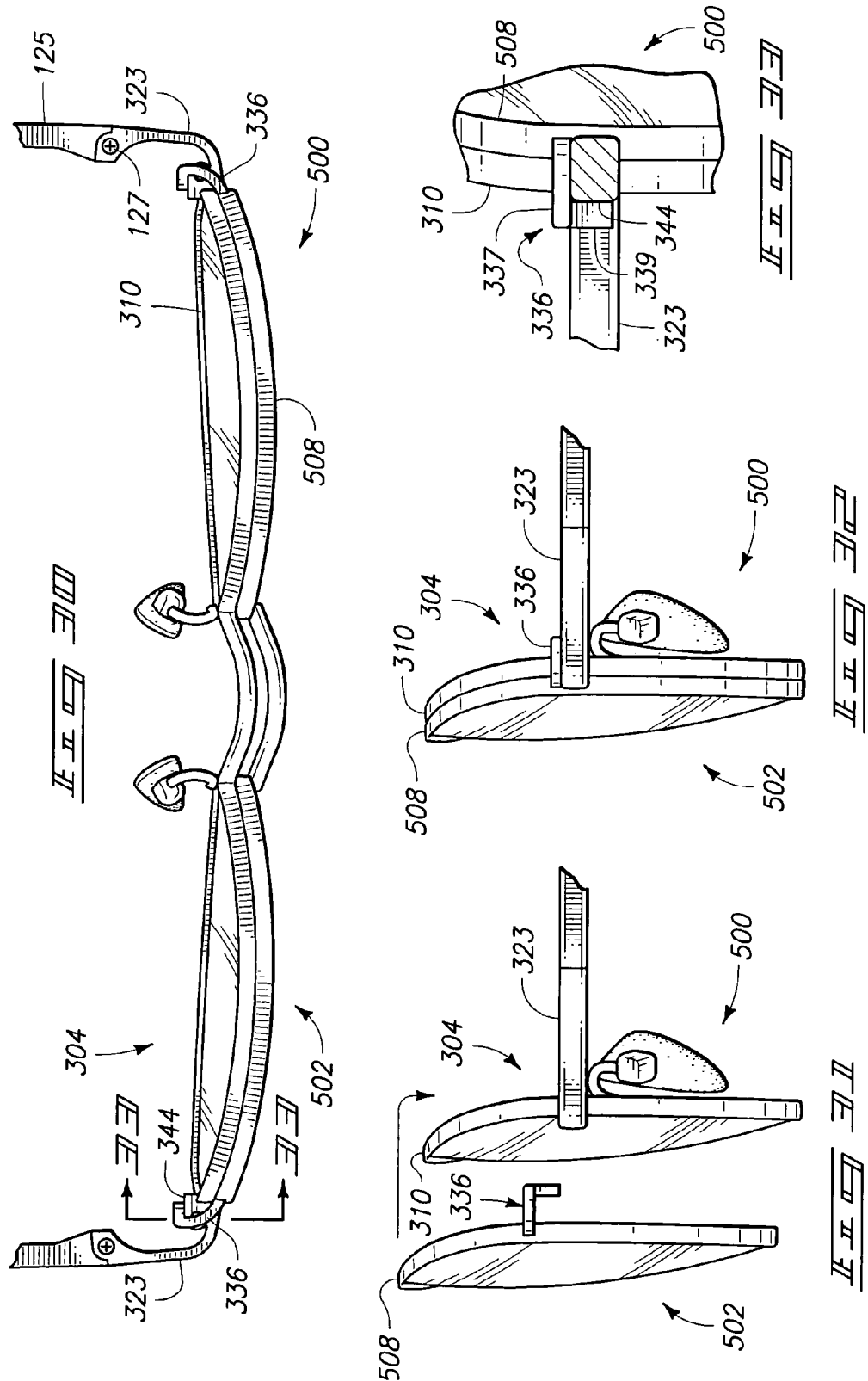

METHOD OF FORMING MAGNETIC EYEGLASS APPLIANCE

RELATED PATENT DATA

This patent is a continuation application of U.S. patent application Ser. No. 10/167,808, filed Jun. 10, 2002 now abandoned, entitled "Method of Forming Magnetic Eyeglass Appliance" and naming James Archie McKenna and Greg S. Smith as inventors, which is a continuation of U.S. patent application Ser. No. 09/663,346, filed Sep. 15, 2000, and which is now U.S. Pat. No. 6,412,942 B1, issued Jul. 2, 2002, the disclosure of which is incorporated by reference.

TECHNICAL FIELD

This invention pertains to eyewear. More particularly, this invention relates to auxiliary frames for eyeglasses and eyeglass appliances.

BACKGROUND OF THE INVENTION

U.S. Pat. No. 4,070,103 to Meeker discloses eyeglasses and attachable pairs of one-piece lens rim covers. According to one embodiment, a magnetic strip is provided in a groove on an inside surface of the lens rim cover. A respective lens rim on the eyeglasses is partially or entirely manufactured of magnetizable material which facilitates attachment of the lens rim covers via the magnetic band onto the rim of the eyeglasses. However, the provision of a magnetic band within a groove on a lens rim cover is relatively bulky and complex, and detracts from the aesthetic look of each lens rim cover when applied onto eyeglasses. Such problem is particularly undesirable where the eyeglasses are styled with relatively thin, low-profile lens rims.

U.S. Pat. No. 5,786,880 to Chao discloses a spectacle, or eyeglass, frame including a primary frame and a secondary frame having one or more magnetizable members engaged in the eyeglass frame prior to magnetizing the members. The members, engaged into the frame by excavating the frame, are then electroplated and painted such that the magnetic members are embedded in the frame. After electroplating and painting, a magnetizing machine, such as an electromagnetic machine, is used to magnetize the members within the frame so as to prevent damaging the outer appearance of the frame. However, such technique requires the excavation of holes within an eyeglass frame. The eyeglass frame comprises a substrate material, wherein the magnets are then engaged within such excavated holes. Accordingly, the resulting eyeglass frame is relatively bulky and the discrete magnets disposed therein are not always sufficiently powerful enough to retain together a primary frame and an auxiliary frame on an eyeglass frame, particularly when such eyeglass frame is utilized during rigorous activities, such as during sporting events and while running.

U.S. Pat. Nos. 5,568,207, 5,737,054, 5,882,101, 5,877,838, 5,883,688, and 5,883,689, all to Chao, and U.S. Pat. No. 6,012,811 to Chao, et al. variously disclose auxiliary lenses, eyeglass appliances, and eyeglass frames utilizing discrete magnets and/or hook members, clips, or flaps for fixation onto eyeglasses. However, numerous problems are still encountered with such devices; namely, such devices render the eyeglass frames relatively cumbersome and aesthetically unpleasing when affixed onto eyeglasses. Furthermore, there still remain misalignment problems and difficulties in mating and demating such eyeglass frames from a pair of eyeglasses.

Accordingly, there exists a need for further improved methods and apparatus for attaching auxiliary frames to primary frames, such as when attaching eyeglass frames onto eyeglasses. Particularly, there exists a need for an apparatus and method that can more easily, firmly and elegantly attach auxiliary frames to primary frames so as to present an aesthetically pleasing eyeglass device.

SUMMARY OF THE INVENTION

An auxiliary frame and a primary frame/auxiliary frame eyeglass device each include a heat treated magnetic alloy to impart magnetic properties capable of affixing together an auxiliary frame and a primary frame. According to one construction, the primary frame comprises eyeglasses, and the auxiliary frame comprises a sunglass attachment. According to one construction, the heat treated magnetic alloy comprises a spinodal decomposition alloy such as an iron-chromium-cobalt alloy that is first formed into a desired object shape, then heat treated to impart desired magnetic properties to the desired object shape.

According to one aspect, an eyeglass accessory frame includes an auxiliary frame. The auxiliary frame includes a heat-treated magnetic alloy. The heat-treated magnetic alloy of the auxiliary frame is configured to magnetically couple the auxiliary frame to a primary frame having magnetizable material.

According to another aspect, an eyeglass device includes a primary frame and an auxiliary frame. The primary frame includes magnetizable material. The auxiliary frame includes a spinodal decomposition alloy that is heat treated to magnetize at least a portion of the auxiliary frame. The magnetized portion of the auxiliary frame interacts with the magnetizable material of the primary frame to magnetically couple the auxiliary frame to the primary frame.

According to yet another aspect, an eyeglass device includes a first frame and a second frame. The first frame includes magnetizable material. A second, complementary frame includes a heat-treated magnetic alloy. The magnetic alloy of the second frame interacts with the magnetizable material of the first frame to magnetically couple together the first frame and the second frame.

According to even another aspect, a method is provided for forming a magnetic eyeglass appliance. The method includes: forming an accessory frame at least in part from a spinodal decomposition alloy; and heat treating the formed accessory frame to magnetize the spinodal decomposition alloy.

According to yet even another aspect, a method is provided for forming a magnetic eyeglass appliance. The method includes: providing an auxiliary frame having a spinodal decomposition alloy; and heat treating the spinodal decomposition alloy to magnetize the spinodal decomposition alloy.

BRIEF DESCRIPTION OF THE DRAWINGS

Preferred embodiments of the invention are described below with reference to the following accompanying drawings.

FIG. 2 is a front view of the first embodiment auxiliary frame attached to the primary frame.

FIG. 3 is a back view of the first embodiment auxiliary frame.

FIG. 4 is a top view of the auxiliary frame and the primary frame in the first embodiment of the present invention prior to attachment of the auxiliary frame onto the primary frame.

FIG. 5 is a top view of the auxiliary frame attached to the primary frame of FIG. 4 in the first embodiment of the present invention.

FIG. 6 is a right side view of the auxiliary frame and the primary frame in the first embodiment of the present invention prior to attachment of the auxiliary frame onto the primary frame.

FIG. 7 is a right side view of the auxiliary frame attached to the primary frame in the first embodiment of the present invention.

FIG. 8 is an enlarged, partial and vertical breakaway view taken along line 8—8 of FIG. 2 showing the auxiliary frame attached to the primary frame in the first embodiment of the present invention.

FIG. 9 is a simplified perspective view illustrating mounting of a second embodiment auxiliary frame onto a primary frame wherein a user is holding the primary frame in one hand and the auxiliary frame in another hand.

FIG. 10 is a front view of the second embodiment auxiliary frame attached to the primary frame.

FIG. 11 is a back view of the second embodiment auxiliary frame.

FIG. 12 is a top view of the auxiliary frame attached to the primary frame in the second embodiment of the present invention.

FIG. 13 is a right side view of the auxiliary frame and the primary frame in the second embodiment of the present invention prior to attachment of the auxiliary frame onto the primary frame.

FIG. 14 is a right side view of the auxiliary frame attached to the primary frame in the second embodiment of the present invention.

FIG. 15 is an enlarged, partial and vertical breakaway view taken along line 15—15 of FIG. 10 showing the auxiliary frame attached to the primary frame in the second embodiment of the present invention.

FIG. 18 is a top view of the auxiliary frame attached to the primary frame in the third embodiment of the present invention.

FIG. 19 is a right side view of the auxiliary frame and the primary frame in the third embodiment of the present invention prior to attachment of the auxiliary frame onto the primary frame.

FIG. 20 is a right side view of the auxiliary frame attached to the primary frame in the third embodiment of the present invention.

FIG. 21 is an enlarged, partial and vertical breakaway view taken along line 21—21 of FIG. 16 showing the auxiliary frame attached to the primary frame in the third embodiment of the present invention.

FIG. 22 is an enlarged, partial and vertical breakaway view taken along line 22—22 of FIG. 16 showing a recess within a circumferential extension extending about a lense of the auxiliary frame and inter-digitating with a stud of the primary frame.

FIG. 23 is a front view of a fourth embodiment auxiliary frame attached to the primary frame.

FIG. 24 is a back view of the fourth embodiment auxiliary frame.

FIG. 25 is a top view of the auxiliary frame attached to the primary frame in the fourth embodiment of the present invention.

FIG. 26 is a right side view of the auxiliary frame and the primary frame in the fourth embodiment of the present invention prior to attachment of the auxiliary frame onto the primary frame.

FIG. 27 is a right side view of the auxiliary frame attached to the primary frame in the fourth embodiment of the present invention.

FIG. 28 is a front view of a fifth embodiment auxiliary frame attached to the primary frame.

FIG. 29 is a back view of the fifth embodiment auxiliary frame.

FIG. 30 is a top view of the auxiliary frame attached to the primary frame in the fifth embodiment of the present invention.

FIG. 31 is a right side view of the auxiliary frame and the primary frame in the fifth embodiment of the present invention prior to attachment of the auxiliary frame onto the primary frame.

FIG. 32 is a right side view of the auxiliary frame attached to the primary frame in the fifth embodiment of the present invention.

FIG. 33 is an enlarged, partial and vertical breakaway view taken along line 33—33 of FIG. 30 showing magnetic and physical interdigitating engagement between an arm of the auxiliary frame with a stud of the primary frame.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. Several implementations are described below and depicted with reference to the drawings, each comprising an apparatus and method for securing an auxiliary frame to a primary frame such as when securing a sunglass attachment onto an eyeglass. FIGS. 1–8 illustrate a first embodiment. FIGS. 9–15 illustrate a second embodiment. FIGS. 16–22 illustrate a third embodiment. FIGS. 23–27 illustrate a fourth embodiment. Finally, FIGS. 28–33 illustrate a fifth embodiment. While the invention is described by way of several preferred embodiments, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
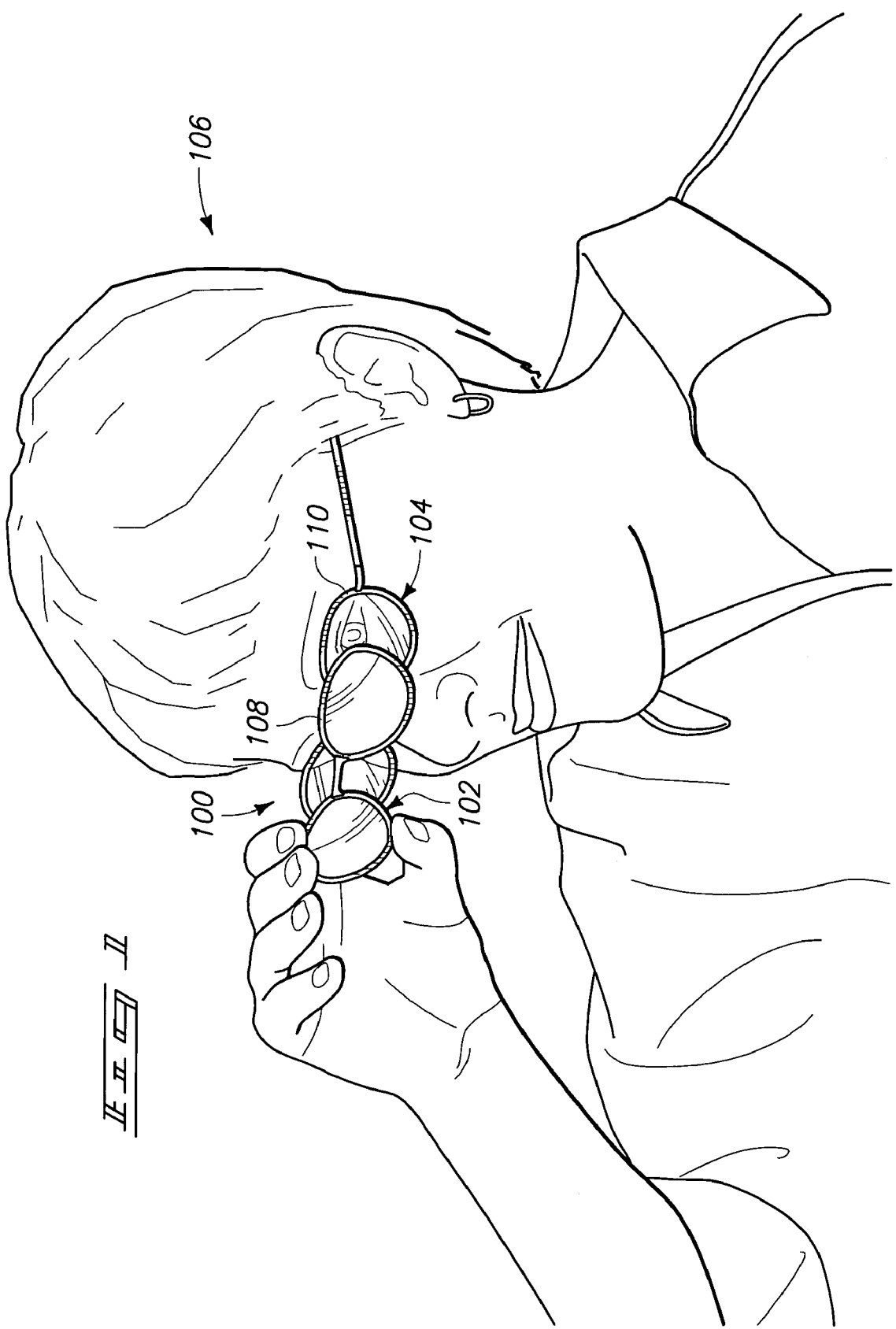
FIG. 1 is a simplified perspective view of a user of eyeglasses illustrating mounting of a first embodiment auxiliary frame onto a primary frame while the user is wearing the primary frame.
Figures 16, 17:
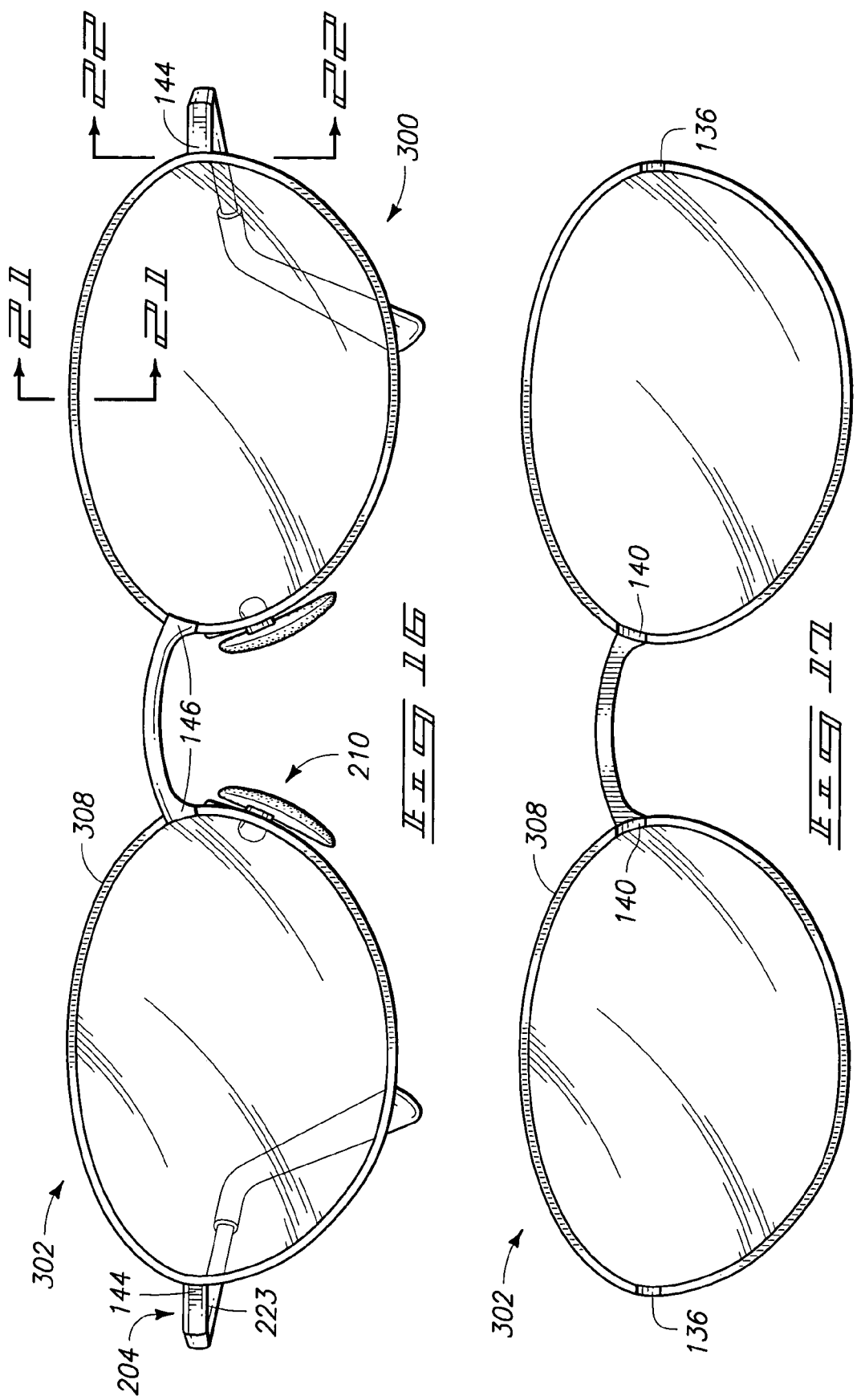
FIG. 16 is a front view of a third embodiment auxiliary frame attached to the primary frame.
FIG. 17 is a back view of the third embodiment auxiliary frame.

FIG. 1 illustrates one preferred embodiment of Applicant's invention wherein an eyeglass device is provided and identified with reference numeral 100. Eyeglass device 100 comprises a sunglass attachment 102 that is removably affixed to eyeglasses 104 and worn by a user 106. Sunglass attachment 102 is configured to be mated and demated from eyeglasses 104, either while eyeglasses 104 are worn by user 106, or while eyeglasses 104 are removed from user 106 as depicted below with reference to an alternative embodiment in FIG. 9.

As shown in FIG. 1, sunglass attachment 102 comprises an auxiliary frame 108, and eyeglasses 104 comprise a primary frame 110. Auxiliary frame 108 is formed at least in part from a magnetic alloy and primary frame 110 is formed at least in part from a magnetizable material. According to one construction, auxiliary frame 108 is formed entirely from a magnetic alloy, and primary frame 110 is formed entirely from a magnetizable material. According to other constructions, only discrete components used to form auxiliary frame 108 are formed from a magnetic alloy, and discrete components used to form primary frame 110 are formed from a magnetizable material. Cooperation between the magnetic alloy of auxiliary frame 108 and the magnetizable material of primary frame 110, when placed together in contact or close proximity, causes auxiliary frame 108 to be magnetically coupled to primary frame 110 which frictionally couples together primary frame 110 and auxiliary frame 108.

More particularly, auxiliary frame 108 is constructed to have a rearmost surface (toward a user) that conforms to the frontmost surface (away from a user) of primary frame 110, especially with respect to the magnetic alloy of auxiliary frame 108 and the magnetizable material of primary frame 110. Preferably, auxiliary frame 108 conforms to the general shape of primary frame 110 such that good "fit up", or substantially parallel alignment and nesting, occurs therebetween so as to provide substantially uniform contact or close positioning therebetween. Accordingly, the magnetic alloy of auxiliary frame 108 imparts magnetic attraction with the magnetizable material of primary frame 110.

According to an alternative construction, auxiliary frame 108 is formed at least in part from magnetizable material, and primary frame 110 is formed from a magnetic alloy such that complementary, substantially mating portions therebetween are formed from the magnetizable material and magnetic alloy, respectively.

According to one construction, one suitable magnetic alloy comprises a spinodal decomposition alloy having properties similar to stainless steel. In one form, such spinodal decomposition alloy is manufactured in a wire form shape. One such spinodal decomposition an iron-chromium-cobalt magnetic alloy having relatively favorable magnetic properties. Such alloy is formed into a desired shape, utilizing the wire form alloy material, and is subsequently processed by heat treating such desirable alloy in the desired shape to impart a desired magnetic property.

Utilization of such a spinodal decomposition alloy has heretofore not been known in the construction of eyeglasses and eyewear accessories. Instead, Applicant has discovered that such spinodal decomposition alloys have previously been used in the construction of security tags for consumer products. Applicant's efforts to design a solution to the previously described prior art problems entailed an evaluation and search of materials and processing methods heretofore not previously utilized in the construction of eyeglasses and eyeglass accessories.

One commercially available source of such a spinodal decomposition alloy is The Arnold Engineering Company, Rolled Products Division, 300 N. West Street, Meringo, Ill. 60152. The Arnold Engineering Company produces in a wire form, sells, and heat treats such a spinodal decomposition alloy under the tradename "Arnokrome 3™". Applicant has formed a desired auxiliary frame utilizing such wire form. After forming the auxiliary frame using the spinodal decomposition alloy, the source imparts desired magnetic properties into the spinodal decomposition alloy and auxiliary frame by heat treating such alloy. Details of specific constructions for such spinodal decomposition alloy and heat treating process are disclosed in U.S. Pat. No. 4,120,704 to Anderson, and assigned to The Arnold Engineering Company. Such U.S. Pat. No. 4,120,704 is herein incorporated by reference.

Several other heat-treated, magnetic alloys can be utilized on a primary frame or a secondary frame to magnetically affix together the primary frame and secondary frame. U.S. Pat. No. 3,806,336 to Kaneko, et al.; U.S. Pat. No. 3,954,519 to Inoue; U.S. Pat. No. 3,982,972 to Iwata, et al.; U.S. Pat. No. 4,324,597 to Kamino, et al.; U.S. Pat. No. 4,251,293 to Jin; U.S. Pat. No. 4,236,919 to Kamino; U.S. Pat. No. 4,253,883 to Jin; U.S. Pat. No. 4,311,537 to Chin, et al.; U.S. Pat. No. 4,601,876 to Yamashita, et al.; U.S. Pat. No. 4,604,147 to Brandis, et al.; and U.S. Pat. No. 5,351,033 to Liu, et al. disclose various suitable alloys which can be imparted with a magnetic property, herein incorporated by reference. Additionally, details in the use of such alloys as applied to the non-analogous art of security markers and security tags are illustrated in U.S. Pat. No. 4,967,185 to Montean; U.S. Pat. No. 5,432,499 to Montean; and U.S. Pat. No. 5,477,219 to Zarembo, et al., herein incorporated by reference.

According to one construction, one suitable magnetizable material comprises steel. However, it is understood that a magnetizable material can be provided by a steel, stainless steel, or any alloy that is capable of being physically attracted to a magnetic material when brought into close proximity thereto.

In assembly, sunglass attachment 102 and eyeglasses 104 of eyeglass device 100 are affixed together by magnetic attraction via cooperation of the magnetic alloy of auxiliary frame 108 which imparts a magnetic (and frictional) bond with the magnetizable material of primary frame 110, as shown in FIG. 2. According to the construction depicted in FIG. 2, auxiliary frame 108 is adapted to be removably mated and demated from primary frame 110 even while a user is wearing eyeglasses 104. Such mating and demating is made relatively easy and reliable because the need for clips and auxiliary retaining devices has been eliminated via use of magnetic alloy in auxiliary frame 108.

Additionally, auxiliary frame 108 is configured (as seen in front view and edge view) so as to substantially conform to the shape and dimensions of primary frame 110. However, legs 123 are not covered by auxiliary frame 108 in this embodiment. Accordingly, a pleasing aesthetic appearance is presented in assembly by eyeglass device 100. Accordingly, eyeglass device 100 is imparted with an appearance that leaves an observer with the impression that auxiliary frames 108 are not even present, and that an outward appearance similar to primary frame 110 is presented by eyeglass device 100. Hence, the appearance of a traditional "add-on" or "clip-on" sunglasses attachment is eliminated through use of sunglass attachment 102 on eyeglasses 104.

FIG. 3 further illustrates the rear surface of sunglass attachment 102, and namely, auxiliary frame 108. Preferably, the entire periphery of auxiliary frame 108 is formed from magnetic alloy, wherein such rear peripheral surface about each lens mates in engagement with a leading edge of primary frame 110 (see FIG. 4) so as to provide for enhanced magnetic attachment and coaction therebetween in assembly.

FIG. 4 illustrates the mounting of sunglass attachment 102 to the front surface of eyeglasses 104. One suitable attachment technique is illustrated in FIG. 1, wherein a user is wearing eyeglasses 104, and sunglass attachment 102 is merely placed into alignment and engaged with eyeglasses 104 to impart magnetic attraction and fixation therebetween. Optionally, sunglass attachment 102 and eyeglasses 104 can be assembled together while hand held and removed from a user, as depicted below with reference to an alternative embodiment in FIG. 9.

As shown in FIG. 4, sunglass attachment 102 comprises auxiliary frame 108 including a pair of auxiliary lenses 112 and 114. According to one construction, auxiliary lenses 112 and 114 each comprise a sunglass lens, such as a polarized lens. Optionally, auxiliary lenses 112 and 114 can comprise magnifying lenses, colored lenses, filter lenses, and/or bifocal lenses. Furthermore, eyeglasses 104 comprise a pair of primary lenses 116 and 118, such as a pair of ground, prescription lenses configured to correct a user's vision.

Auxiliary frame 108 further comprises a nose bridge 120 that joins together a pair of auxiliary retaining mechanisms, or lens rims, 124 and 126. Similarly, a nose bridge 122 on primary frame 110 joins together a pair of primary retaining mechanisms, or lens rims, 128 and 130. Furthermore, a pair of temple extension members, or legs, 123 extend rearwardly of primary frame 110 on opposite lateral ends. Each leg 123 pivotally supports a stud, or temple member, 125 by way of a pivot pin 127, according to any one of a number of techniques that are presently understood in the art.

As shown in FIG. 5, sunglass attachment 102 is affixed to eyeglasses 104 through magnetic engagement of auxiliary frame 108 when placed in conforming adjacent and nested relationship with primary frame 110. According to one such construction, bridges 120 and 122 are not placed into physically abutting relation, and therefore do not contribute to magnetic engagement therebetween. Alternatively, bridge 120 can be formed from magnetic alloy, bridge 122 can be formed of magnetizable material, and bridges 120 and 122 can be configured to engage in assembly so as to impart magnetic attraction therebetween.

FIGS. 6 and 7 further illustrate in side view the pre-assembled configuration (of FIG. 4) and the assembled configuration (of FIG. 5) for sunglass attachment 102 and eyeglasses 104 of eyeglass device 100. More particularly, FIGS. 6 and 7 illustrate the substantially conforming configuration of auxiliary frame 108 and primary frame 110 prior to and after nested engagement therebetween, respectively. Accordingly, it is understood that a rear edge or face of auxiliary frame 108 substantially conforms to the geometry of a front edge or face on primary frame 110. When assembled together as shown in FIG. 7, rear edge of auxiliary frame 108 is brought into close, proximate, and substantially engaged relationship with front edge of primary frame 110 so as to impart magnetic attraction and affixation therebetween. However, it is understood that a surface finish such as paint or plating material can be optionally applied on one or more of auxiliary frame 108 and primary frame 110 such that magnetic attraction occurs across the finish. Accordingly, auxiliary frame 108 is affixed onto primary frame 110 as a result of frictional engagement therebetween which is imparted by magnetic attraction between the magnetic alloy of auxiliary frame 108 and the magnetizable material of primary frame 110.

As shown in FIG. 8, the rear edge of auxiliary frame 108 is shown in direct, physical abutment with the front edge of primary frame 110. Accordingly, magnetic attraction imparts such frictional engagement therebetween sufficient to retain sunglass attachment 102 to eyeglasses 104 (see FIG. 2).

Although auxiliary frame 108 of sunglass attachment 102 is shown in direct engagement with primary frame 110, it is understood that it is not necessary that each lens rim 128 and 130 (see FIG. 4) be placed into complete circumferential engagement with primary frame 110. Local point contacts therebetween may impart sufficient magnetic attraction. However, to enhance magnetic attraction therebetween, it is preferable but not necessary that such complete circumferential engagement be realized.

Furthermore, it is desirable to provide a maximum amount of contact surface area between auxiliary frame 108 and primary frame 110 in order to enhance magnetic attraction therebetween. However, it is understood that the amount of surface area required is only that necessary to impart sufficient retention of a sunglass attachment onto complementary eyeglasses. Accordingly, the specific degree of "fit up" and contact between auxiliary frame 108 and primary frame 110 of the sunglass attachment and eyeglasses, respectively, can vary depending upon the weight of the sunglass attachment and the degree of magnetism that has been imparted to the magnetic alloy of auxiliary frame 108.

FIG. 9 illustrates a second embodiment of sunglass attachment 202 that is similar to sunglass attachment 102 (of FIGS. 1–8), and that is configured for magnetic mounting onto eyeglasses 104. However, sunglass attachment 202 comprises auxiliary frame 208 that is formed at least in part from magnetic alloy and further includes a pair of rim flanges 132 and 134. Rim flanges 132 and 134 each depend along a topmost edge of auxiliary frame 208 and are configured to lie atop a topmost edge of primary frame 110 in assembly. Accordingly, rim flanges 132 and 134 assist magnetic attraction in the retention of auxiliary frame 208 onto primary frame 110.

Such alternative embodiment is particularly desirable when a user of eyeglasses 104 is participating in rigorous physical activities such as running, playing volleyball, or any activity where shaking of eyeglasses 104 and sunglass attachment 202 is potentially likely to dislodge the sunglass attachment 202 from eyeglasses 104. Such dislodgement is due to inertial forces that act on sunglass attachment 202 and exceed the frictional forces imparted by a magnetic attraction between auxiliary frame 208 and primary frame 210. However, it is understood that the addition of rim flanges 132 and 134 is not necessary in many applications, particularly those where rigorous exertion does not result in significant deceleration forces being applied to auxiliary frame 208 such as result from shaking and vibration, or where sufficient magnetism can be realized to impart fixation under these conditions. Accordingly, sunglass attachment 202 and eyeglasses 104 cooperate to provide an alternative embodiment eyeglass device 200 that provides enhanced retention therebetween which is particularly suited for rigorous activities and environments.

The mating and demating between sunglass attachment 202 and eyeglasses 104 (of FIG. 9) is further illustrated below with reference to FIGS. 10–15. As shown in FIG. 10, auxiliary frame 208 of sunglass attachment 202 nests into magnetically engaged attachment with primary frame 110 of eyeglasses 104. As shown in frontal view, rim flanges 132 and 134 are configured along the upper edges of primary frame 110 so as to minimize any deleterious effects on the overall aesthetic appearance of eyeglass device 200. Furthermore, rim flanges 132 and 134 each provide a discrete shelf, or ledge, that engages along an upper surface of primary frame 110 (as shown in FIG. 15). A remaining portion of auxiliary frame 208, excluding rim flanges 132 and 134, mates in magnetically affixed physical abutment similar to the abutment shown in the first embodiment of FIG. 8.

FIG. 11 further illustrates the construction of rim flanges 132 and 134. According to one construction, rim flanges 132 and 134 are also constructed from a magnetic alloy, such as a spinodal decomposition alloy. Alternatively, rim flanges 132 and 134 are formed of a non-magnetic material, such as a nonmagnetic alloy, thereby contributing to retention and alignment between auxiliary frame 208 and primary frame 110. Hence, rim flanges 132 and 134 also provide accurate alignment when assembling sunglass attachment 102 into magnetic engagement with eyeglasses 104. Accordingly, rim flanges 132 and 134 further provide for mechanical affixation via coaction of rim flanges 132 and 134 with an uppermost edge of primary frame 110.

FIGS. 12–14 further illustrate in greater detail the relatively streamlined and unobtrusive manner in which rim flanges 132 and 134 overlie primary frame 110 when sunglass attachment 202 is assembled in magnetic engagement and overlying relationship with eyeglasses 104. As shown in FIGS. 12 and 14, rim flanges 132 and 134 completely overlie an upper edge of primary frame 110 between nose bridge 122 and each temple extension member 123, respectively. Such substantially complete overlying of flanges 132 and 134 along an upper edge of primary frame 110 serves to partially conceal an edge-view seam formed between auxiliary frame 208 and primary frame 110, particularly when viewing eyeglass device 200 from above. Accordingly, additional aesthetic features are provided by rim flanges 132 and 134.

Furthermore, auxiliary retaining mechanisms 224 and 226 include rim flanges 132 and 134, respectively, wherein individual eyepieces are retained by each auxiliary retaining mechanism 224 and 226, respectively. According to one construction, a slit is provided in each auxiliary retaining mechanism 224 and 226 (not shown) to make the auxiliary retaining mechanism discontinuous to facilitate insertion and removal of lenses. A pair of ferrules are provided on opposite sides of such slit such that a threaded fastener is used to secure together the slit and close the auxiliary retaining mechanism, which serves to facilitate insertion, removal and retention of a lens within such auxiliary retaining mechanism. Further details of such construction are presently understood in the art and are omitted herein from this and other embodiments in order to avoid obscuring the invention at hand.

FIG. 13 illustrates auxiliary frame 208 of sunglass attachment 202 prior to aligned assembly with primary frame 110 of eyeglasses 104. Conforming fit up and retention between sunglass attachment 202 and eyeglasses 104 is further depicted in the assembled state of eyeglass device 200, as illustrated in FIG. 14.

FIG. 15 illustrates magnetic attachment of auxiliary frame 208 onto primary frame 110 so as to secure the sunglass attachment onto the eyeglasses. More particularly, the construction of rim flanges 134 is clearly seen overlying primary frame 110 to provide further additional support and alignment of auxiliary frame 208 onto primary frame 110. Such physical overlying engagement supplements magnetic attachment provided by the magnetic alloy as used in the construction of auxiliary frame 208. Accordingly, primary retention is imparted by the magnetic alloy of auxiliary frame 208 which imparts frictional engagement and results in magnetic attraction with the magnetizable material of primary frame 110. Such magnetic engagement is further assured by the presence of rim flanges 134 interacting with the upper edge of primary frame 110. Additionally, rim flanges 134 serve to further support auxiliary frame 208 atop primary frame 110.

FIGS. 16–22 illustrate a third embodiment auxiliary frame 308 that is magnetically and physically affixed to a primary frame 210 so as to form in assembly eyeglass device 300. More particularly, an auxiliary frame 308 is constructed substantially identical to sunglass attachment 102 of FIGS. 1–8, with the exception that a pair of outer slots 136 and a pair of inner slots 140 are formed in the rear surface of auxiliary frame 308 in order to provide interdigitating fit up with a front face of eyeglasses 204. Eyeglasses 204 are similar to eyeglasses 104 illustrated variously in the embodiments of FIGS. 1–15 and 23–27. However, eyeglasses 204 include the additional features of a raised or forwardly extending leg end portion 144 that is provided on opposite ends by legs 223 and a pair of raised or forwardly extending arms 146 provided at opposite ends of bridge 122. Raised leg end portions 144 and raised arms 146 are configured to extend forwardly of a respective, adjacent front face of primary frame 210 so as to provide interdigitating engagement with slots 136 and 140, respectively, when assembled together as illustrated in FIG. 20.

As shown in FIG. 19, slot 136 of auxiliary frame 308 is sized and configured to nest in interdigitating engagement with raised leg end portion 144 as auxiliary frame 308 is brought into magnetic engagement and retention with primary frame 210. Upon engagement as illustrated in FIG. 20, slot 136 cooperates with raised leg end portion 144 to further facilitate alignment and fit up between auxiliary frame 308 and primary frame 210 when magnetically affixed therebetween. Accordingly, such interdigitating engagement further enhances the frictional retention that is imparted between auxiliary frame 308 and primary frame 210 as a result of the magnetic alloy of auxiliary frame 308 imparting magnetic affixation to the magnetizable material of primary frame 210. Similarly, raised arms 146 engage in interdigitating relationship with slots 140 (of FIG. 17) to further enhance aligned engagement.

FIG. 21 illustrates attachment of auxiliary frame 308 onto primary frame 210 resulting from magnetic attraction therebetween (which causes frictional engagement), and further ensured by physical interdigitation of the slots, arms and leg end portions described previously with reference to FIGS. 16–20. As was the case with the embodiments depicted in FIGS. 1–15, good physical abutment and fit up are preferably imparted between the magnetic alloy portions of auxiliary frame 308 and the magnetizable material portions of primary frame 210.

Preferably, the entire peripheral contact portion of auxiliary frame 308 is formed from a magnetic alloy such as spinodal decomposition alloy, and the entire leading contact surface of primary frame 210 is formed from a magnetizable material, such as a steel, stainless steel, or alloy that is capable of being physically attracted to a magnetic material when brought into close proximity thereto.

FIG. 22 illustrates in greater detail the interlocking or interdigitating engagement provided between raised leg end portion 144 and slot 138. It is understood that raised arms 146 similarly interdigitate with slots 140 and 142. As shown in FIG. 22, substantially uniform and even fit up is imparted between retaining mechanism 130 of the primary frame and the auxiliary retaining mechanism 326 of the auxiliary frame. Since the auxiliary retaining mechanism 326 is frictionably engaged with the retaining mechanism 130 due to magnetic attraction therebetween, cooperation between the slots and raised arms or raised leg end portions, such as slot 136 and raised leg end portion 144, aligns and locks together the sunglass attachment onto the eyeglass, thereby further ensuring that good fit up and magnetic attraction is imparted therebetween which enhances the magnetic retention, particularly when utilizing the resulting eyeglass device in relatively harsh environments.

FIGS. 23–27 illustrate the construction of a fourth embodiment sunglass attachment 402 that is magnetically affixed onto eyeglasses 104 (as shown in the first two embodiments) to form in assembly an eyeglass device 400. More particularly, an auxiliary frame 408 of sunglass attachment 402 is provided with a pair of forked retention members 236. Forked retention members 236 cooperate with legs 123 of primary frame 110 to further ensure retention of sunglass attachment 402 onto eyeglasses 104 when subjecting such eyeglass device 400 to harsh environments, such as when participating in sporting events, that are susceptible of jarring apart sunglass attachment 402 from eyeglasses 104.

As shown in FIG. 23, opposite outermost edges of auxiliary frame 408 each include a dedicated forked retention member 236 which cooperates with each leg 123 extending from primary frame 110 as auxiliary frame 408 is magnetically affixed onto primary frame 110. When assembled together, forked retention members 236 serve to align sunglass attachment 402 onto eyeglasses 104 so as to impart optimal fit up therebetween and ensure magnetic attachment as a result thereof.

FIG. 24 further illustrates the mounting and positioning of each forked retention member 236 on auxiliary frame 408. It is understood that auxiliary frame 408 is substantially the same as auxiliary frame 108 depicted as the first embodiment of FIGS. 1–8, except for the addition of forked retention member 236. Forked retention members 236 may or may not be formed from a magnetic alloy.

FIGS. 25–27 illustrate in greater detail the enhanced retention provided by forked retention members 236 as they cooperate with eyeglasses 104 in assembly. As shown in FIG. 25, eyeglasses 104 are essentially identical to the first two embodiments depicted in FIGS. 1–15, wherein a leg end portion 244 on each leg, or temple extension member, 123 is substantially flush with the front edge of primary frame 110. Each forked retention member 236 is sized to wrap around a top and bottom edge of each leg end portion 144 to align auxiliary frame 408 onto primary frame 110 during mating engagement. Forked retention members 236 further maintain fit up and alignment during magnetic engagement between auxiliary frame 408 and primary frame 110. Accordingly, such interdigitating engagement further ensures aligned, magnetized attachment of sunglass attachment 402 onto eyeglasses 104.

Accordingly, forked retention members 236 provide an alternative construction over that provided by the interdigitating engagement utilized in the embodiment of FIGS. 16–22, including raised leg end portions 144, raised arms 146, and slots 136 and 140, respectively.

As shown in FIG. 26, each forked retention member 236 includes an upper arm 147 and a lower arm 148 which are spaced apart sufficiently to receive leg end portion 144 therebetween. According to one construction, arms 147 and 148 are sufficiently spaced apart in relation to leg end portion 144 such that forked retention member 236 merely provides alignment between auxiliary frame 408 and primary frame 110, and does not provide an interference fit therebetween sufficient to solely provide for attachment of sunglass attachment 402 onto eyeglasses 104. Alternatively, arms 147 and 148 can be spaced apart so as to impart an interference fit with leg end portion 244 that provides additional holding power (above that provided solely by magnetic attachment) between sunglass attachment 402 and eyeglasses 104.

As shown in FIG. 27, auxiliary frame 408 is primarily affixed to primary frame 110 as a result of the magnetic attraction imparted by use of magnetic alloy in constructing auxiliary frame 408, and utilization of a magnetizable material such as a steel alloy in constructing primary frame 110. However, forked retention members 236 cooperate with leg end portions 244 in assembly to ensure that good alignment and fit up occurs between the respective magnetic alloy and magnetizable material of auxiliary frame 408 and primary frame 110, respectively, so as to ensure continued retention even when utilizing eyeglass device 400 in harsh environments that might otherwise cause separation therebetween.

FIGS. 28–33 illustrate the construction of a fifth embodiment sunglass attachment 502 that is magnetically affixed onto eyeglasses 304. Eyeglasses 304 are similar to eyeglasses 204 shown in the third embodiment of FIG. 18, but include leg end portions 344 (see FIG. 30) similar to leg end portions 244 of FIG. 25. Sunglass attachment 502 combines with eyeglasses 304 to form in assembly an eyeglass device 500. More particularly, an auxiliary frame 508 of sunglass attachment 502 is provided with a pair of wrap-around retention arms 336. Retention arms 336 cooperate with primary frame 310 to further ensure retention of sunglass attachment 502 onto eyeglasses 204 when subjecting such eyeglass device 500 to harsh environments, such as when participating in sporting events, that are susceptible of jarring apart sunglass attachment 502 from eyeglasses 204.

As shown in FIG. 28, opposite outermost edges of auxiliary frame 508 each include a dedicated retention arm 336 which cooperates with each leg 323 extending from primary frame 310 as auxiliary frame 508 is magnetically affixed onto primary frame 310. When assembled together, retention arms 336 serve to align sunglass attachment 502 onto eyeglasses 204 so as to impart optimal fit up therebetween and ensure magnetic attachment as a result thereof.

To provide magnetic affixation, one of retention arms 336 and retention arm abutment surface 334 comprises a heat-treated magnetic alloy such as a spinodal decomposition alloy. One such alloy comprises Arnokrome 3™. Another of retention arms 336 and retention arm abutment surface 334 comprises magnetizable material, such as a steel or stainless steel alloy. According to one construction, retention arms 336 comprise a heat treated magnetic alloy and retention arm abutment surface 344 comprises magnetizable material. According to another construction, retention arms 336 comprise magnetizable material and retention arm abutment surface 334 comprises a heat-treated magnetic alloy.

For the case where retention arms 336 comprise a heat-treated magnetic alloy and retention arm abutment surface 334 comprises magnetizable material, it is understood that auxiliary frame 508 and primary frame 310 might be formed from materials other than a heat-treated magnetic alloy and a magnetizable material. The same holds true for the case where retention arms 336 comprise magnetizable material and retention arm abutment surface 334 comprises a heat-treated magnetic alloy. According to such cases, magnetic attraction is imparted between sunglass attachment 502 and eyeglasses 304 based solely upon interaction between retention arms 336 and retention abutment surface 334. Interdigitating physical coupling is additionally provided by retention arms 336 which wrap around legs 323 to physically abut with retention arm abutment surfaces 334. Optionally, auxiliary frame 508 and primary frame 310 can be formed from materials which impart further magnetic attraction therebetween by using one of a heat-treated magnetic alloy and a magnetizable material, respectively.

FIG. 29 further illustrates the positioning of each wrap-around retention arm 336 onto auxiliary frame 508. It is understood that auxiliary frame 508 is constructed with substantially the same geometry as auxiliary frame 408 depicted as the fourth embodiment of FIGS. 23–27, except for the substitution of retention arms 336 for forked retention members 236.

As a further optional construction, retention arms 336 are not formed from a heat-treated magnetic alloy or a magnetizable material. Instead, magnetic attraction is imparted between sunglass attachment 502 and eyeglass 304 by forming respective pieces from one of a heat-treated magnetic alloy or a magnetizable material, or from another of such heat-treated magnetic alloy or such magnetizable material.

FIGS. 30–33 illustrate in greater detail the enhanced retention provided by wrap-around retention arms 336 as they cooperate in assembly with eyeglasses 304. As shown in FIG. 30, eyeglasses 304 are essentially identical to the first two embodiments depicted in FIGS. 1–15, wherein a leg end portion 344 on each leg, or temple extension member, 323 is substantially flush with the front edge of primary frame 310. Each retention arm 336 is sized to wrap around a top and rear edge of each leg end portion 344 to align auxiliary frame 508 onto primary frame 310 during mating engagement. Retention members 336 further maintain fit up and alignment and magnetic engagement between auxiliary frame 508 and primary frame 310. Accordingly, such interdigitating engagement further ensures aligned, magnetized attachment of sunglass attachment 502 onto eyeglasses 304.

Accordingly, retention arms 336 provide an alternative construction over that provided by the interdigitating engagement of the forked retention arms utilized in the embodiment of FIGS. 23–27.

As shown in FIG. 31, each retention arm 336 wraps around a respective leg 323 of eyeglasses 304. During assembly, auxiliary frame 508 is elevated relative to eyeglasses 304 so retention arms 336 clear legs 323. Auxiliary frame 508 is then lowered into aligned, nested assembly with eyeglasses 304 so that retention arms 336 magnetically engage with respective legs 323, as shown in FIG. 32.

More particularly, FIG. 33 illustrates in greater detail the nested, magnetic engagement between retention arm 336 and leg 323 which secures auxiliary frame 508 to eyeglasses 304. Retention arm 336 comprises a rearwardly extending finger 337 and a retaining pad 339 depending downwardly from finger 337. Pad 339 and finger 337 in one embodiment comprise a spinodal decomposition alloy which is magnetized via the above-described heat treating process. According to such embodiment, a leg end portion 344 of leg 323 comprises a magnetizable material, such as a stainless steel alloy. Alternatively, retention arm 336 comprises a magnetizable material such as a stainless steel alloy, and leg end portion 344 (and leg 323) comprises a spinodal decomposition alloy that is heat treated to impart magnetic properties thereto.

As shown in FIG. 33, auxiliary frame 508 is primarily affixed to primary frame 310 as a result of the magnetic attraction imparted by use of magnetic alloy in constructing retention arm 336, and utilization of a magnetizable material such as a steel or stainless steel alloy in constructing leg end portion 344 (of leg 323) on eyeglasses 304. In assembly, retention arms 336 cooperate with leg end portions 344 (and legs 323) to ensure that good alignment and fit-up between auxiliary frame 508 and primary frame 310. The manner in which retention arms 336 wrap around leg end portion 344 provides further mechanical affixation of auxiliary frame 508 onto primary frame 310 so as to ensure continued retention even when utilizing eyeglass device 500 in harsh environments that might otherwise cause separation therebetween.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming a magnetic eyeglass appliance, comprising:
   forming an eyeglass frame at least in part from an alloy capable of being rendered magnetic responsive to being heat treated; and
   heat treating the alloy to magnetize the alloy.

2. The method of claim 1 wherein the eyeglass frame comprises an accessory frame.

3. The method of claim 1 wherein the eyeglass frame comprises a primary frame.

4. The method of claim 1 wherein the alloy is heat treated prior to forming the eyeglass frame.

5. The method of claim 1 wherein the alloy is heat treated subsequent to forming the eyeglass frame.

6. The method of claim 1 further comprising supporting tinted lenses from the eyeglass frame.

7. The method of claim 1 further comprising supporting sunglass lenses from the eyeglass frame.

8. The method of claim 1 further comprising supporting corrective lenses from the eyeglass frame.

9. The method of claim 1 further comprising magnetically attaching the frame to a pair of glasses having a second frame, the second frame including material capable of being attracted by a magnet, by aligning the first mentioned frame with the second frame and bringing the first mentioned frame and the second frame into proximity with one another.

10. The method of claim 9 further comprising detaching the frame from the glasses by applying a separation force to overcome the magnetic force attracting the first mentioned frame to the second frame.

11. The method of claim 1 wherein the eyeglass frame is magnetized to a level sufficient that the frame is supportable from a frame of a pair of glasses, for movement with the pair of glasses, solely by magnetic attraction.

12. The method of claim 1 wherein the eyeglass frame includes an alignment structure, and further comprising internesting the alignment structure with complementary structure on a complementary eyeglass frame, the complementary eyeglass frame including material capable of being attracted by a magnet, by aligning the eyeglass frame with the complementary eyeglass frame using the alignment structure and the complementary structure and bringing the eyeglass frame and the complementary eyeglass frame into proximity with one another to impart magnetized attraction therebetween.

13. The method of claim 12 wherein the alignment structure and the complementary structure internest in mechanically interlocking relation therebetween.

14. A method of forming an attachment, for use with a pair of eyeglasses, the method comprising:

providing a material capable of being imparted with properties of a magnet in response to being heat treated;

forming an eyeglass frame at least in part from the material; and heat treating the material to magnetize the material.

15. The method of claim 14 wherein the eyeglass frame includes an alignment structure, and wherein the alignment structure is formed at least in part from a material capable of being imparted with properties of a magnet in response to being heat treated.

16. The method of claim 15 wherein, excluding the alignment structure, a remaining portion of the eyeglass frame is formed from a magnetically non-reactive material.

17. A method of forming a magnetic sunglass attachment, for use with a pair of eyeglasses, the method comprising:

providing a material capable of being imparted with properties of a magnet in response to being heat treated;

forming an eyeglass frame at least in part from the material;

heat treating the material to magnetize the material; and supporting tinted lenses from the eyeglass frame.

18. The method of claim 17 wherein heat treating is carried out prior to forming the eyeglass frame.

19. The method of claim 17 wherein heat treating is carried out subsequent to forming the eyeglass frame.

20. The method of claim 17 wherein forming an eyeglass frame further comprises forming an alignment structure on the eyeglass frame configured to internest in assembly with a primary frame having a pair of eyeglasses.

* * * * *

UNITED STATES PATENT AND TRADEMARK OFFICE
CERTIFICATE OF CORRECTION

PATENT NO. : 7,140,728 B2
APPLICATION NO. : 10/862934
DATED : November 28, 2006
INVENTOR(S) : James Archie McKenna et al.

It is certified that error appears in the above-identified patent and that said Letters Patent is hereby corrected as shown below:

Title Page 2, FOREIGN PATENT DOCUMENTS, please add --CA 2286765 10/1998--

Title Page 2, OTHER PUBLICATIONS, please add --"Strip & Foil Products", Group Arnold, 2 pages, http://www.grouparnold.com/products/rolled/index.html; printed Jul. 6, 2000.--

Title Page 2, OTHER PUBLICATIONS, fourth entry, line 2, please delete "Processing", Apr. 5-8, 1999; Tutorial, 16 pages plus title page;" and insert --Processing", Arnold Engineering Co., Apr. 5-8, 1999; Tutorial, 16 pages plus title page;--

Col. 5, line 44, please insert --alloy comprises-- after "spinodal decomposition".

Signed and Sealed this

Twenty-sixth Day of June, 2007

JON W. DUDAS
*Director of the United States Patent and Trademark Office*